(12) United States Patent
Naka (10) Patent No.: US 7,848,354 B2
(45) Date of Patent: Dec. 7, 2010

(54) WIRELESS COMMUNICATION APPARATUS (75) Inventor: Katsuyoshi Naka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 484 days.

(21) Appl. No.: 11/721,611

(22) PCT Filed: Dec. 8, 2005

(86) PCT No.: PCT/JP2005/022569
§ 371 (c)(1),
(2), (4) Date: Jun. 13, 2007

(87) PCT Pub. No.: WO2006/064716
PCT Pub. Date: Jun. 22, 2006

(65) Prior Publication Data
US 2009/0238208 A1 Sep. 24, 2009

(30) Foreign Application Priority Data
Dec. 14, 2004 (JP) ............... 2004-361102

(51) Int. Cl.
H04J 3/22 (2006.01)
(52) U.S. Cl. .................. 370/470; 370/474
(58) Field of Classification Search .......... 370/470, 370/471, 474, 475, 468, 328, 329, 338
See application file for complete search history.

(56) References Cited
U.S. PATENT DOCUMENTS
6,477,670 B1 * 11/2002 Ahmadvand ............. 714/712
6,542,490 B1   4/2003 Ahmadvand et al.
7,197,282 B2 * 3/2007 Dent et al. ............... 455/67.14

(Continued)

FOREIGN PATENT DOCUMENTS
JP  2000 224261  8/2000

(Continued)

OTHER PUBLICATIONS
PCT International Search Report dated Feb. 7, 2006 with English translation.

(Continued)

Primary Examiner—Brian D Nguyen
(74) Attorney, Agent, or Firm—Dickinson Wright PLLC (57) ABSTRACT

A wireless communication apparatus wherein the throughput is improved. In a wireless communication apparatus (100), a frame generating part (120) adds a header to a data portion to form a transport frame. A control part (190) acquires a variation index in a propagation path and decides the length of the data portion of the transport frame in accordance with the propagation path variation index. In this way, when the propagation path variation index is large, that is, the degree of propagation path variation is high, the data portion can be shortened. Contrarily, when the propagation path variation index is small, that is, the degree of propagation path variation is low, the data portion can be elongated. Thus, when the degree of propagation path variation is high and hence the probability of reception of a retransmission request from a receiving end is high, the data portion can be shortened to prevent a degradation of the throughput that would occur due to a transmission of long data. Contrarily, when the probability of reception of a retransmission request is low, a long data can be transmitted to improve the throughput.

5 Claims, 8 Drawing Sheets

U.S. PATENT DOCUMENTS

| | | | |
|---|---|---|---|
| 2002/0016852 A1* | 2/2002 | Nishihara | 709/236 |
| 2005/0094552 A1* | 5/2005 | Abe et al. | 370/208 |
| 2005/0135403 A1* | 6/2005 | Ketchum et al. | 370/437 |
| 2005/0135416 A1* | 6/2005 | Ketchum et al. | 370/469 |
| 2005/0180363 A1* | 8/2005 | Yano et al. | 370/335 |
| 2005/0207436 A1* | 9/2005 | Varma | 370/412 |

FOREIGN PATENT DOCUMENTS

| | | |
|---|---|---|
| JP | 2000-224261 | 8/2000 |
| JP | 2001-136226 | 5/2001 |
| JP | 2003 163652 | 6/2003 |
| JP | 2003-163652 | 6/2003 |
| JP | 2005 176367 | 6/2005 |

OTHER PUBLICATIONS

S. Choi, et al.: "Throughput Enhancement via Frame Aggregation," Seoul National University and Samsung Advance Institute of Technology, IEEE 802.11n meetings, 11-03-376r0-HTSG-Throughput_Enhancement_via_Frame_Aggregation.ppt, May 2003, 16 pages.

Japanese Office Action dated Oct. 20, 2009.

Jean Lorchat at al., "Energy saving in IEEE 802.11 Communications using Frame Aggregation", Global Telecommunications Conference, GLOBECOM '03, IEEE, Dec. 2003, pp. 1296-1300.

Japanese Office Action, dated Feb. 23, 2010.

* cited by examiner

WIRELESS COMMUNICATION APPARATUS

TECHNICAL FIELD

The present invention particularly relates to a wireless communication apparatus that performs frame transmission.

BACKGROUND ART

Figure 1:
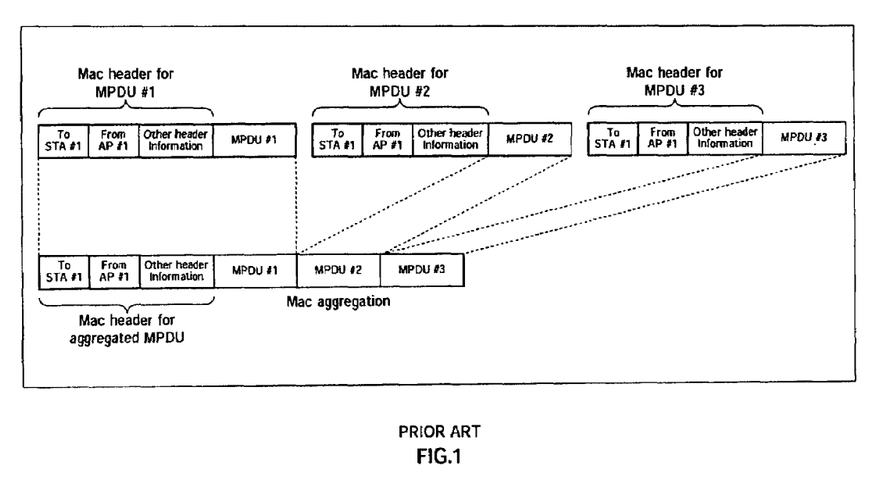
FIG. 1 is a view which provides a description of frame aggregation.

A frame aggregation scheme is proposed as a method to improve throughput in a wireless LAN system (refer to Non-Patent Document 1). According to this frame aggregation scheme, as shown in FIG. 1, relatively small frame data, in which the MAC header information (destination address, etc.) is the same, is transmitted as one large frame.

Even if data is transmitted by a plurality of frames in case of IEEE802.11 scheme which does not perform frame aggregation, by transmitting the data as one large frame, in accordance with the frame aggregation method, it is possible to reduce the IFS (Inter-Frame Space) which is the predetermined waiting time between transmission frames, and the MAC header. Further, as a result of employing the frame aggregation scheme, the overall system throughput improves.

Non-Patent Document 1:

"HTSG Throughput Enhancement via Frame Aggregation," Seoul National University and Samsung, 2003, May 5, IEEE802.11n meeting, 11-03-376r0-HTSG-Throughput_Enhancement_via_Frame_Aggregation.ppt

DISCLOSURE OF INVENTION

Problems to be Solved by the Invention

However, in a conventional communication system, when a frame error occurs in a long frame subjected to frame aggregation as a result of reception quality deterioration due to severe channel fluctuation, there is a problem that transmission rate is significantly deteriorated, which then leads to decreased throughput.

It is therefore an object of the present invention to provide a wireless communication apparatus that improves throughput.

Means for Solving the Problem

The wireless communication apparatus adopts a configuration having: a transmission frame generating section that adds a header to a data part, and forms a transmission frame; a channel variation index acquiring section that acquires an index of variation of a channel; and a data length deciding section that decides the length of the data part of the transmission frame according to the channel variation index.

ADVANTAGEOUS EFFECTS OF THE INVENTION

According to the present invention, it is possible to provide a wireless communication apparatus that improves throughput.

BEST MODE FOR CARRYING OUT THE INVENTION

Next, embodiments of the present invention will be described in detail with reference to the accompanying drawings. In the embodiments, the same components are designated by the reference numerals and all overlapping descriptions thereof will be hereby omitted.

Embodiment 1

Figure 2:
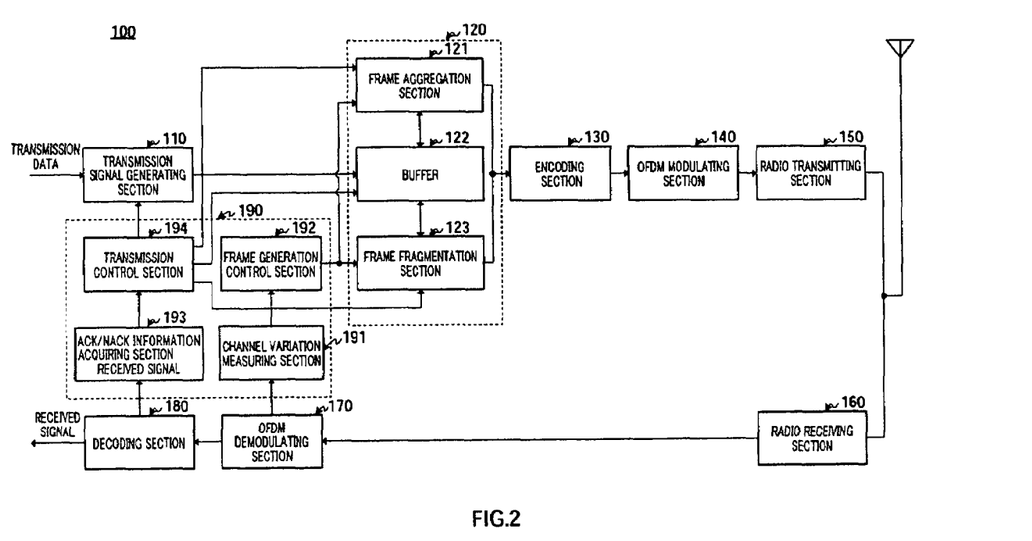
FIG. 2 is a block diagram showing a configuration of a wireless communication apparatus according to embodiment 1 of the present invention.

As shown in FIG. 2, wireless communication apparatus 100 of embodiment 1 comprises transmission signal generating section 110, frame generating section 120, encoding section 130, OFDM modulating section 140, radio transmitting section 150, radio receiving section 160, OFDM demodulating section 170, decoding section 180, and control section 190. Further, frame generating section 120 comprises frame aggregation section 121, buffer 122 and frame fragmentation section 123. Control section 190 comprises channel variation measuring section 191, frame generation control section 192, ACK/NACK information acquiring section 193, and transmission control section 194.

Transmission signal generating section 110 receives as input transmission data such as QoS (Quality of Service) transmission data, etc., and adds a suitable MAC header and FCS (Frame Check Sequence), etc., and generates a transmission signal. Then, transmission signal generating section 110 passes the generated transmission signal to frame generating section 120, based on a transmission command signal (including a transmission command and transmission timing) from control section 190. More specifically, transmission signal generating section 110 passes the transmission signal in response to the transmission command, based on the transmission timing included in the transmission command signal.

Frame generating section 120 generates a transmission frame from the inputted transmission signal, in response to a "frame generation command signal" received from control section 190.

More specifically, if the frame generation command signal contains an "aggregation command" and "the number of aggregation frames," frame generating section 120 groups as many transmission signals as the number of aggregation frames ("aggregation") from inputted transmission signals, and generates one aggregation frame.

Also, if the frame generation command signal contains a "fragmentation command" and "the number of fragmentation frames," frame generating section 120 generates fragmentation frames according to the number of fragmentation frames, from one frame of transmission signals, from the inputted transmission signals. In other words, a fragmentation frame has a length of the product of the inverse of the number of segmentations and the length of one frame. Identification information is attached to the header part of the aggregation frame and the fragmentation frame, to indicate an aggregation frame or a fragmentation frame. Further, in the header part of the aggregation frame, the destination address of the frames before aggregation is commonized. On the other hand, the header part of each fragmentation frame is attached the fragmentation number in addition to the usual sequence number.

Then, the transmission frame generated by frame generating section 120 is passed to encoding section 130. Frame generating section 120 will be later described in detail.

Encoding section 130 performs suitable encoding for inputted frames. According to this optimum encoding, encoding determined according to the frame type is carried out, and, if the target frame is a QoS frame and adaptive modulation is applied thereto, the encoding rate, etc. varies according to the channel.

OFDM modulating section 140 performs predetermined M-ary modulation and signal processing required for OFDM modulation, such as IFFT, etc., on the inputted frames, and generates an OFDM modulated signal. If adaptive modulation is supported, the primary modulation scheme (QPSK, 16QAM, etc.) is varied according to the channel.

Radio transmitting section 150 performs RF processing (up-conversion, etc.) on the inputted frames and transmits the result via an antenna.

Radio receiving section 160 receives the signal inputted via the antenna and performs RF processing (down-conversion, etc.) on this received signal.

OFDM demodulating section 170 receives the inputted RF-processed signal, and performs the required received signal processing, such as FFT and deinterleaving, on the received OFDM signal, to perform OFDM demodulation.

Decoding section 180 receives as input the OFDM demodulated signal to perform suitable error correction decoding and outputs the decoded signal as a received signal.

Control section 190 receives as input the OFDM demodulated signal and the received signal after error correction decoding and controls transmission signal generating section 110 and frame generating section 120. More specifically, control section 190 outputs a transmission command signal (which includes the transmission command and the transmission timing) to transmission signal generating section 110, and controls transmission signal output from transmission signal generating section 110.

Also, control section 190 measures the channel variation with respect to wireless communication apparatus 200 (described later) by using an OFDM demodulated signal, and determines "the degree of channel variation." Then, control section 190 switches between frame aggregation ("grouping") and frame fragmentation ("segmentation"), following the frame generation command signals outputted to frame generating section 120, according to "the degree of channel variation."

For instance, control section 190 determines the "channel variation index," and compares this to a predetermined threshold value, and, if the "channel variation index" is greater than a predetermined threshold value (that is, if the degree of channel variation is high), control section 109 controls frame generating section 120 to perform frame fragmentation. Also, if the "channel variation index" is equal to or lower than a predetermined threshold value (that is, if the degree of channel variation is low), control section 109 controls frame generating section 120 to perform frame aggregation.

Figure 3:
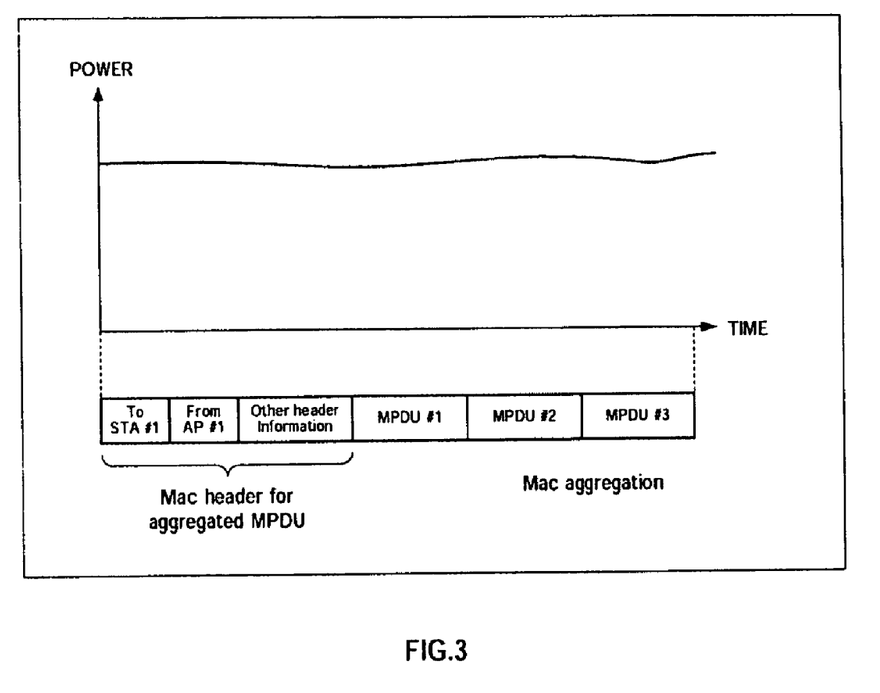
FIG. 3 is a view which provides a description of the relationship between the condition of channel variation and frame aggregation.
Figure 4:
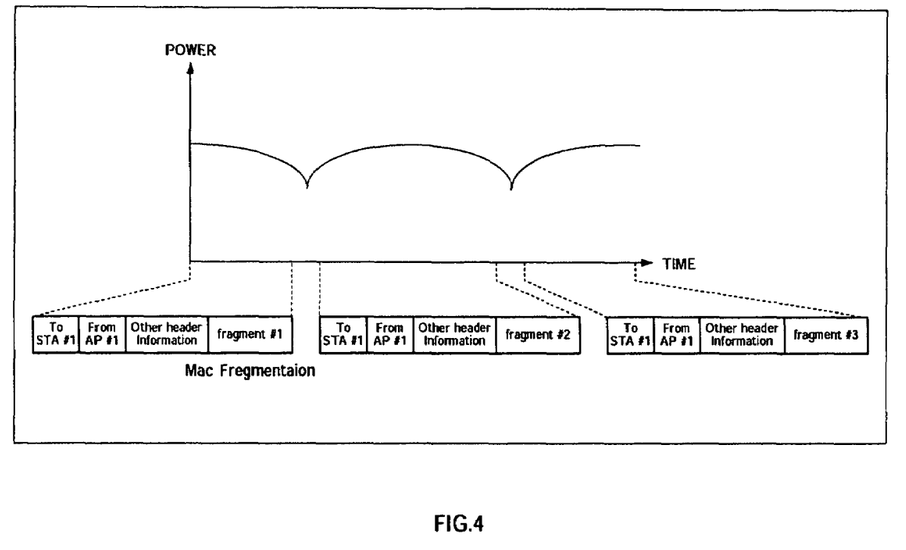
FIG. 4 is a view which provides a description of the relationship between the condition of channel variation and frame fragmentation.

More specifically, in control section 190, channel variation measuring section 191 receives as input the output signal of OFDM demodulating section 170 (i.e. the demodulated signal of the pilot carrier or the subcarrier for data transmitted from later-described wireless communication apparatus 200, such as the CTS (Clear To Send) frame or other feedback information), and generates a graph (herein after "channel variation measurement result") showing the condition of channel variation including received power with respect to time (refer to FIG. 3 and FIG. 4). Here, FIG. 3 shows a graph where the degree of channel variation is low, and FIG. 4 shows a graph where the degree of channel variation is high.

Frame generation control section 192 determines the absolute value for the "channel variation rate" from the absolute value of its gradient, based on the channel variation measurement result obtained by channel variation measuring section 191, and employs it as a "channel variation index." Then, frame generation control section 192 outputs a frame generation command signal in accordance with the absolute value of the "channel variation rate," to frame generating section 120.

More specifically, when the absolute value of the channel variation rate is greater than the predetermined threshold value, frame generation control section 192 determines the frame fragmentation command and the number of fragmentation frames in accordance with the absolute value of the "channel variation rate," and outputs a frame generation command signal including these. Also, when the absolute value of channel variation rate is equal to or lower than the predetermined threshold value, frame generation control section 192 determines the frame aggregation command and the number of aggregation frames in accordance with the absolute value of the "channel variation rate," and outputs a frame generation command signal including these.

Thus, frame generation control section 192 determines the absolute value of the "channel variation rate" which is the "channel variation index," and decides the number of aggregation frames (i.e. the number of groups) or the number of fragmentation frames (i.e. the number of segmentations) of the transmission frames, in accordance with this absolute value of the "channel variation rate." In particular, when "the degree of channel variation" is large, long frames are transmitted at the time when there is a low possibility that the frame transmitted from wireless communication apparatus 100 can be correctly received at the receiving side, and it is therefore necessary to retransmit long frames when a retransmission request is received from the receiving side, and as a result the transmission rate is significantly damaged, which leads to decreased throughput. Thus, if "the degree of channel variation" is large, it is advantageous to increase the number of segmentations, depending on the degree of channel variation, or decrease the number of groups in the case of grouping.

On the one hand, when "the degree of channel variation" is small, there is a high possibility that the frame transmitted from wireless communication apparatus 100 can be correctly received at the receiving side, and so the number of groups is increased to improve the overall system throughput.

Accordingly, by determining the number of groups or the number of segmentations in accordance with "the degree of channel variation," it is possible to improve the overall system throughput. The MPDU (MAC Protocol Data Unit) of the aggregation frame shown in FIG. 3, is the "base data unit" to be aggregated in the case of aggregation in the MAC layer. Also, "fragment" in FIG. 4 showing the fragmentation frames represent data parts obtained by dividing the "base data unit" by the number of segmentations (i.e. the number of segmentations).

Also, ACK/NACK information acquiring section 193 receives as input the output signal of decoding section 180, and decides whether the feedback information from the receiving station side (that is, wireless communication apparatus 200 to be described later) is ACK or NACK. Then, ACK/NACK information acquiring section 193 generates decision result information (including the data sequence number and ACK/NACK information).

Transmission control section 194 outputs the transmission command signal (including the transmission command and the transmission timing) to transmission signal generating section 110, and controls the transmission signal output in transmission signal generating section 110. Transmission control section 194 passes the decision result information (including the data sequence number and ACK/NACK information) from ACK/NACK information acquiring section 193 to frame generating section 120.

Next, frame generating section 120 will be described in detail. Buffer 122 in frame generating section 120 receives as input the transmission signals from transmission signal generating section 110 and accumulates these transmission signals. Then, when buffer 122 receives as input a "read signal" from frame aggregation section 121 or from frame fragmentation section 123, buffer 122 outputs the transmission signals accumulated in response to the read signal, to frame aggregation section 121 or frame fragmentation section 123.

Also, buffer 122 receives as input the decision result information from transmission control section 194. Then, if the decision result information contains ACK information, buffer 122 deletes the transmission signal which corresponds to the data sequence number included in the decision result information. On the other hand, if the decision result information contains NACK information, the transmission signal corresponding to the data sequence number included in the decision result information needs to be retransmitted and so buffer 122 keeps this signal, and, upon next transmission opportunity, buffer 122 outputs a new transmission signal or a retransmission transmission signal in response to the "read signal" from frame aggregation section 121 or frame fragmentation section 123.

Frame aggregation section 121 receives as input a frame generation command signal which contains the "aggregation command" and "the number of aggregation frames." Then, frame aggregation section 121 outputs the read signal to buffer 121, based on the frame generation command signal, and reads transmission signals from buffer 122, in accordance with the number of aggregation frames. Further, frame aggregation section 121 groups the read transmission signals ("aggregation") and generates one aggregation frame, and outputs the frame to encoding section 130. The read signals contain the data sequence number determined based on the ACK/NACK information from transmission control section 194. Then, buffer 122 which receives the read signals, outputs corresponding transmission signals.

Frame fragmentation section 123 receives as input a frame generation command signal which contains the "fragmentation command" and "the number of fragmentation frames." Then, frame fragmentation section 123 outputs the read signals to buffer 122, based on the frame generation command signal, and reads one frame of transmission signals. Further, frame fragmentation section 123 generates fragmentation frames in accordance with the number of fragmentation frames from the read transmission signals of one frame, and passes the frames to encoding section 130. The read signal contains the data sequence number determined based on the ACK/NACK information from transmission control section 194. Then, buffer 122 which receives the read signal, outputs the corresponding transmission signals.

Thus, in wireless communication apparatus 100, control section 190 controls the switching of frame aggregation and frame fragmentation in accordance with "the degree of channel variation." In particular, when "the degree of channel variation" is large, there is a low possibility that the frame transmitted from wireless communication apparatus 100 can be correctly received at the receiving side, and the aggregation frame which is subjected to frame aggregation (grouping) at this time is transmitted, and it is necessary to retransmit a frame which has become long by aggregation, when a retransmission request is received from the receiving side, and consequently, the transmission rate is significantly deteriorated, which leads to decreased throughput. For this reason, when "the degree of channel variation" is large, frame fragmentation (segmentation) is advantageous.

On the other hand, when "the degree of channel variation" is small, there is a high possibility that the frame transmitted by wireless communication apparatus 100 can be correctly received at the receiving side, so that the overall system throughput improves by performing frame aggregation.

Thus, the overall system throughput can be improved by switching frame aggregation and frame fragmentation, in accordance with "the degree of channel variation."

Figure 5:
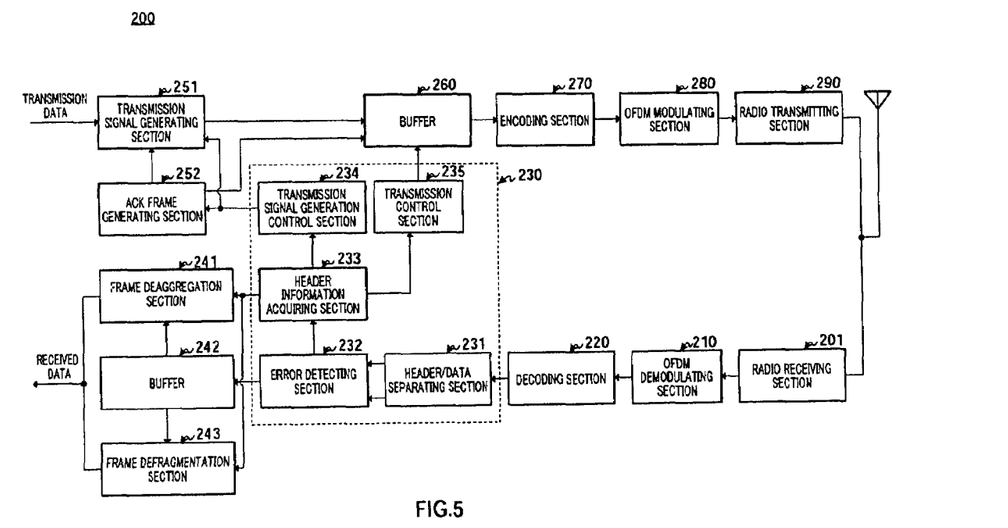
FIG. 5 is a block diagram which shows a configuration of another wireless communication apparatus according to embodiment 1 of the present invention.

As shown in FIG. 5, wireless communication apparatus 200 comprises radio receiving section 201, OFDM demodulating section 210, decoding section 220, control section 230, frame deaggregation section 241, buffer 242, frame defragmentation section 243, transmission signal generating section 251, ACK frame generating section 252, buffer 260, encoding section 270, OFDM modulating section 280, and radio transmitting section 290. Further, control section 230 comprises header/data separating section 231, error detecting section 232, header information acquiring section 233, transmission signal generation control section 234, and transmission control section 235.

A received signal is inputted, via the antenna, to radio receiving section 201, which performs RF processing (downconversion, etc.) on the received signal.

The RF-processed signal is inputted to OFDM demodulating section 210, which performs required received signal processing such as FFT and deinterleaving on the OFDM signal reception, to perform OFDM demodulation.

Decoding section 220 receives as input the OFDM demodulated signal to perform suitable error correction decoding, and outputs the decoded signal as received signal.

Control section 230 receives as input the OFDM demodulated signal and the decoded received signal and controls frame deaggregation section 241, buffer 242, frame defragmentation section 243, transmission signal generating section 251, ACK frame generating section 252, and buffer 260.

More specifically, control section 230 refers to the header information of the output signal of decoding section 220, and, in accordance with the frame identification information (i.e. identification information indicating the aggregation frame and the fragmentation frame) included in the header information, outputs the "command signal and information of the number of target frames" to frame deaggregation section 241 or frame defragmentation section 243. In other words, by outputting the "command signal and information of the number of target frames" to frame deaggregation section 241 and frame defragmentation section 243 and controlling frame deaggregation section 241 and frame defragmentation section 243, control section 230 performs control such that the received data outputted from frame deaggregation section 241 and frame defragmentation section 243 becomes the "base data unit." It is thus possible to form a data unit which becomes the process unit in upper layers above the layer subject to aggregation and defragmentation (in the present embodiment, aggregation and the like is carried out in the MAC layer) in wireless communication apparatus 100.

Also, control section 230 performs error detection on the header part and data part of the output signal from decoding section 220 and controls the type (i.e. ACK and NACK) of the frame generated by ACK frame generating section 252 according to the detection results. Then, control section 230 outputs the content of the data part to buffer 242. In the case that other transmission signals are transmitted, control section 230 outputs a generation command signal to transmission signal generating section 251 and performs signal generation control.

Also, control section 230 determines the transmission timing of the transmission signal and controls the transmission according to the transmission timing. More specifically, control section 230 outputs a transmission command signal to buffer 260 and performs control. Control section 230 will be later described in detail.

Data parts of the received signals are inputted to buffer 242, which accumulates them. Then, buffer 242 outputs the accumulated data to frame deaggregation section 241 and frame defragmentation section 243, from which the read signal is received, according to the read signal from frame deaggregation section 241 and frame defragmentation section 243.

A frame deaggregation command signal is inputted from control section 230, to frame deaggregation section 241. This frame deaggregation command signal contains the "deaggregation command" and "the number of aggregation frames."

Then, when frame deaggregation section 241 receives a frame deaggregation command signal, frame deaggregation section 241 reads out one corresponding aggregation frame, by outputting the read signal to buffer 242, and divides ("deaggregation") this aggregation frame into as many frames as the number of aggregation frames.

A frame defragmentation command signal is inputted to frame defragmentation section 243. This frame defragmentation command signal contains the "defragmentation command" and "the number of defragmentation frames."

Then, when frame defragmentation section 243 receives the frame defragmentation command signal, frame defragmentation section 243 outputs the read signal to buffer 242 to thereby read out as many fragmentation frames as "the number of defragmentation frames," and groups them into one frame ("defragmentation").

Thus, frame deaggregation section 241 and frame defragmentation section 243 read out the frames accumulated in buffer 242, in accordance with the command signal from control section 230, and divides the aggregation frames in accordance with the number of aggregation frames, or groups the fragmentation frames in accordance with the number of fragmentation frames, and output the result as received data. In this way, it is possible to form a data part which becomes the process unit in upper layers above the layer subject to aggregation and defragmentation (in the present embodiment, aggregation and the like is carried out in the MAC layer) in wireless communication apparatus 100.

Transmission signal generating section 251 receives as input the transmission data, and generates the transmission signal, according to the generated command signal from control section 230. This transmission signal is outputted to buffer 260.

When the control signal from control section 230 is an ACK transmission command signal, ACK frame generating section 252 generates an ACK frame. This ACK frame is outputted to buffer 260.

Next, control section 230 will be described in detail. Header/data separating section 231 of this control section 230 separates the output signal from decoding section 220 into the header part and data part, and outputs these to error detecting section 232.

Figure 6:
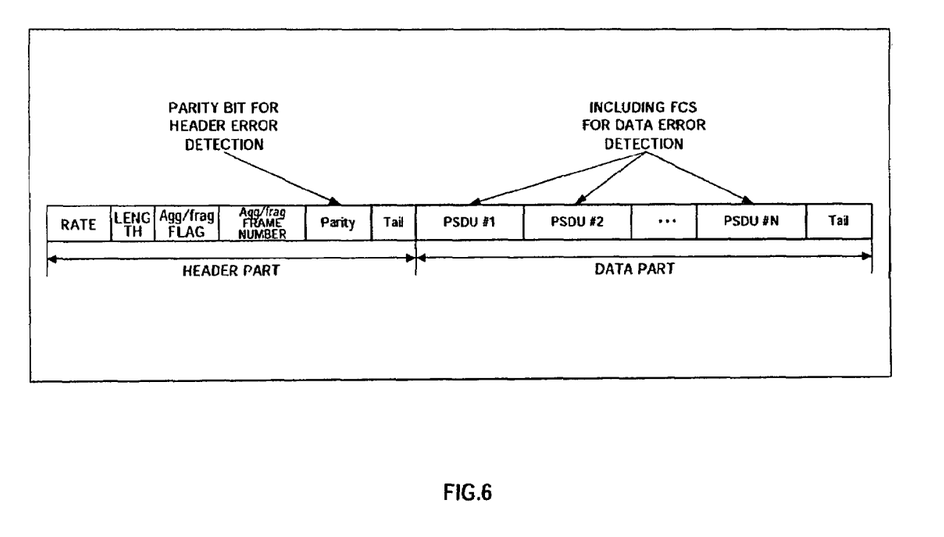
FIG. 6 is a view showing the format of a frame transmitted from the wireless communication apparatus of FIG. 1.

The header part and the data part are inputted from header/data separating section 231 to error detecting section 232. The data format of the received signal is as shown in FIG. 6, for instance. Thus, both the header part and the data part are individually subjected to error correction encoding, and so, even if they are separated by header/data separating section 231 and inputted, each of the two portions can be subjected to suitable error detection. Then, error detecting section 232 outputs the header part and the error detection result of the data part to header information acquiring section 233, and outputs the data part to buffer 242.

The header part and the error detection result of the data part are inputted from error detecting portion 232 to header information acquiring section 233. This header part contains an agg/frag flag field and agg/frag frame number field. Agg/frag flag field includes identification information which indicates whether the frames are aggregation frames or fragmentation frames. Also, agg/frag frame number field contains the number of aggregation frames in the case of aggregation frames, or contains the number of fragmentation frames in the case of fragmentation frames.

Then, header information acquiring section 233 outputs the command signal to frame deaggregation section 241 or frame fragmentation section 243, in accordance with the identification information of agg/frag flag field. More specifically, when the identification information of the agg/frag flag field indicates an aggregation frame, header information acquiring section 233 outputs the frame deaggregation command signal (which contains the "deaggregation command" and "the number of aggregation frames") to frame deaggregation section 241. Also, when the identification information of the agg/frag flag field indicates a fragmentation frame, header information acquiring section 233 outputs the frame defragmentation command signal (which contains the "defragmentation command" and "the number of defragmentation frames") to frame defragmentation section 243.

Then, header information acquiring section 233 decides the error detection results from error detecting section 232, and outputs the decision results to transmission signal generation control section 234, as error status information. Also, if the results of the decision indicating an error is detected (that is, if an ACK frame is returned), header information acquiring section 233 outputs the timing information for returning the ACK frame, to transmission control section 235.

Transmission signal generation control section 234 outputs the control signal to ACK frame generating section 252, in accordance with the error status information from header information acquiring section 233. More specifically, if the error status information shows there is no error, transmission signal generation control section 234 outputs an ACK generation command signal. Also, if the error status information shows there are errors, transmission signal generation control section 234 outputs a NACK generation command signal. Also, to transmit other transmission signals, transmission signal generation control section 234 outputs the generation command signal to transmission signal generation section 251 to perform signal generation control.

Transmission control section 235 outputs the transmission command signal to buffer 260, so as to transmit the ACK frame, in accordance with the transmission timing information inputted from header information acquiring section 233.

Thus, according to embodiment 1, wireless communication apparatus 100 is provided with frame generating section 120 that adds a header to the data part and forms a transmission frame, and control section 190 that acquires the variation index in the channel and determines the length of the data part in the transmission frame according to this channel variation index.

In this way, when the channel variation index is large (that is, when the degree of channel variation is high), the length of the data part can be shortened, and, when the channel variation index is small (that is, when the degree of channel variation is low), the length of the data part can be made longer. Therefore, if the degree of channel variation is high, and there is a high possibility that a retransmission request will be sent from the receiving side, it is possible to suppress decreased throughput caused by long transmission data, and it is possible to transmit long data and improve the throughput when the possibility that a retransmission request will be sent is low. As a result, it is possible to realize wireless communication apparatus 100 and wireless communication apparatus 200 that improve the overall system throughput.

Further, control section 190 determines the number of groups and the number of segmentations of the base data unit, in accordance with the channel variation index, and frame generating section 120 forms a data part having a length in accordance with the determined number of groups and the number of segmentations.

Further, frame generating section 120 comprises frame aggregation section 121 which groups the determined number of groups of base data units, and adds a header and forms a transmission frame, and frame fragmentation section 123 which divides the base data unit in accordance with the determined number of segmentations, and adds a header to each segmentation data and forms a transmission frame.

Also, control section 190 uses the feedback information, etc., from wireless communication apparatus 200, which is the receiving station and determines the channel variation index.

Therefore, new signaling for feedback information, etc., is not necessary.

Embodiment 2

In embodiment 1, wireless communication apparatus 100 uses feedback information, etc., from wireless communication apparatus 200 to determine the degree of channel variation and switches between frame aggregation and frame fragmentation in accordance with the degree of channel variation. Contrary to this, embodiment 2 is characterized in that the receiving station side that receives the aggregation frames and the fragmentation frames uses these frames to measure the degree of channel variation, and, by feeding back the measurement results to the transmitting station side, the transmitting section side uses this feedback information as an index for switching between frame aggregation and frame fragmentation upon next signal transmission.

Figure 7:
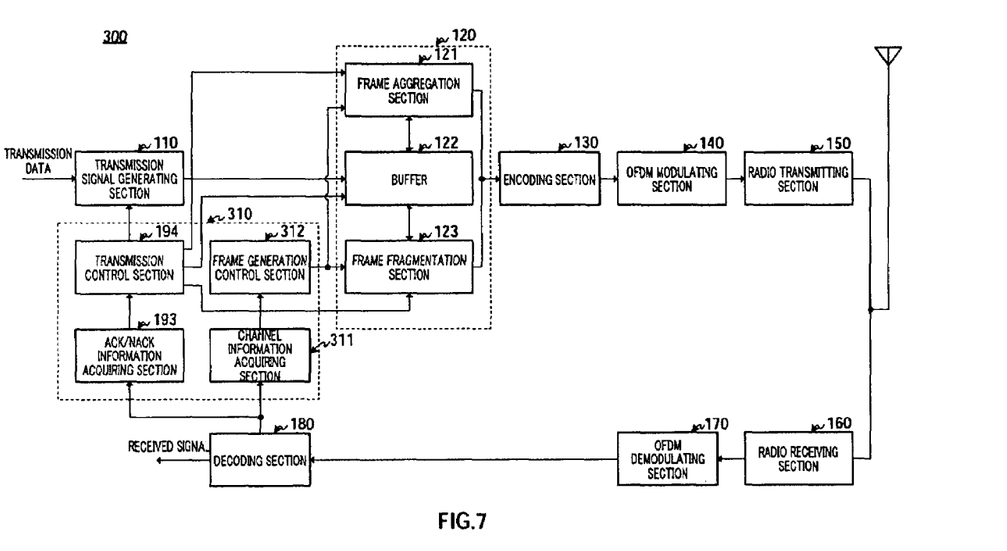
FIG. 7 is a block diagram showing a configuration of a wireless communication apparatus of embodiment 2.

As shown in FIG. 7, wireless communication apparatus 300 has control section 310. Then, control section 310 has channel information acquiring section 311 and frame generation control section 312.

Control section 310 acquires the "channel variation measurement results" transmitted by wireless communication apparatus 400 to be described later, from decoding section 180. Then, control section 310 detects the channel variation with wireless communication apparatus 400, by using these "channel variation measurement results," and determines "the degree of channel variation." Then, control section 310 changes the frame generation command signal to be outputted to frame generating section 120, in accordance with "the degree of channel variation," to switch frame aggregation (grouping) and frame fragmentation (segmentation) in frame generating section 120.

In other words, control section 310 switches frame aggregation (grouping) and frame fragmentation (segmentation) in accordance with "the degree of channel variation" to be determined from the "channel variation 4' measurement results" from wireless communication apparatus 400, which is the receiving station receiving the aggregation frames and the fragmentation frames. These aggregation frames and fragmentation frames represent signals which are longer than feedback information (for instance, pilot carrier, or data subcarrier (for instance, CTS (Clear-To-Send) frame or other feedback information or the like)) from wireless communication apparatus 200, which uses wireless communication apparatus 100 of embodiment 1, and it is therefore possible to accurately understand the condition of the channel by using the above frames in the measurements carried out at the receiving side. Thus, it is possible to adequately switch frame aggregation (grouping) and frame fragmentation (segmentation), so that the overall system throughput can be improved.

In more detail, channel information acquiring section 311 in control section 310 acquires the "channel variation measurement results" which are sent by wireless communication apparatus 400 to be described later, from the output signal of decoding section 180. These "channel variation measurement results" are outputted to frame generation control section 312.

Frame generation control section 312 determines an absolute value of the "channel variation rate" from the absolute value of its gradient, based on the channel variation measurement results, and uses it as "channel variation index." Then, the frame generation command signal in accordance with this absolute value of the "channel variation rate" is outputted to frame generating section 120.

Figure 8:
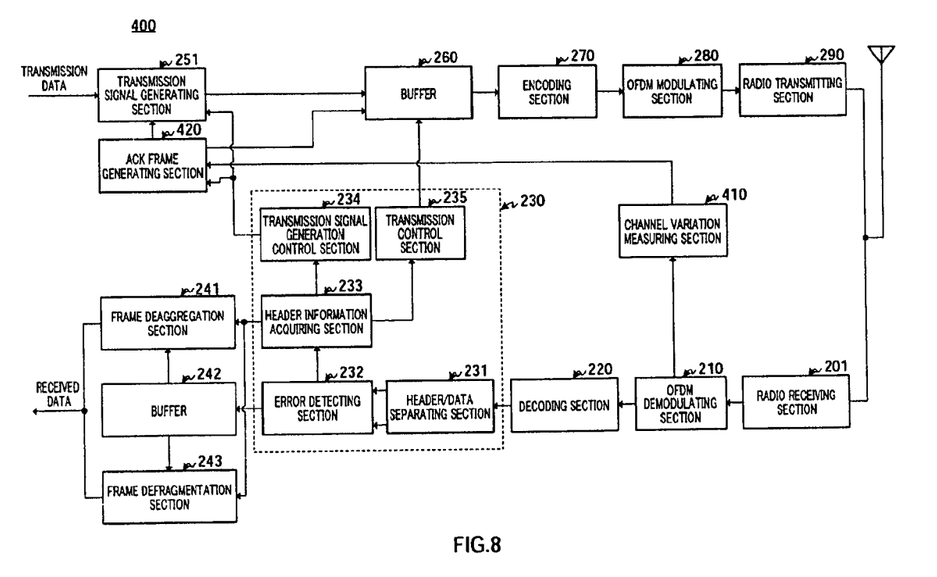
FIG. 8 is a block diagram showing a configuration of another wireless communication apparatus of embodiment 2.

As shown in FIG. 8, wireless communication apparatus 400 of embodiment 2 has channel variation measuring section 410 and ACK frame generating section 420.

Channel variation measuring section 410 receives as input the output signal of OFDM demodulating section 210, of the signals transmitted from wireless communication apparatus 300 (that is, the demodulated signal of the aggregation frame and the fragmentation frame transmitted from wireless communication apparatus 300, for instance) and generates a graph showing the condition of channel variation, such as reception power relative to time, in other words, the "channel variation measurement results" (refer to FIG. 3 and FIG. 4). These "channel variation measurement results" are outputted to ACK frame generating section 420.

An ACK transmission command signal and a NACK transmission command signal are inputted to ACK frame generating section 420 to generate an ACK frame in accordance with these signals. At this time, the "channel variation measurement results" from channel variation measuring section 410 are added to the ACK frame. In this way, the "channel variation measurement results" can be used in wireless communication apparatus 300, which receives this ACK frame, for switching frame aggregation and frame fragmentation, and the "channel variation measurement results" are added to the ACK frame, which is feedback information which already exists, and it is therefore no longer necessary to prepare a new dedicated frame.

Thus, according to embodiment 2, wireless communication apparatus 300 is provided with frame generating section 120 which adds the header to the data part to form a transmission frame, and control section 310 which acquires the variation index in the channel to determine the length of the data part of the transmission frame, in accordance with this channel variation index.

In this way, when the channel variation index is large (that is, when the degree of channel variation is high), the length of the data part can be shortened, and, when the channel variation index is small (that is, when the degree of channel variation is low), the length of the data part can be made longer. For this reason, when the degree of channel variation is high, and there is a high possibility that a retransmission request will be sent from the receiving side, the decrease in throughput caused by long transmission data is suppressed, and when there is a low possibility that a retransmission request will be sent, the throughput can be improved by transmitting long data. As a result, it is possible to realize wireless communication apparatus 300 and wireless communication apparatus 400 which can improve the overall system throughput.

Then, the channel variation index acquired by control section 310 is determined based on the channel variation measurement results measured by wireless communication apparatus 400, on the basis of the frames transmitted from wireless communication apparatus 300.

In this way, the frames transmitted from wireless communication apparatus 300 represent signals which are longer than the feedback information (for instance, CTS (Clear-To-Send) frames or other feedback information, or the like), and it is therefore possible to understand the condition of the channel more accurately. Thus, the channel variation index can be determined more accurately, and consequently the length of the data part of the transmission frame can be adequately determined, which allows to improve the throughput.

Other Embodiments (1) In wireless communication apparatus 100 of embodiment 1 and wireless communication apparatus 300 of embodiment 2, the degree of channel variation is determined using the feedback information, or the like, and the frame aggregation and frame fragmentation are switched, in accordance with the degree of channel variation. However, the present invention is not limited to this, and frame aggregation and the usual transmission (i.e. transmission of one frame at a time) may be switched in accordance with the degree of channel variation. In this way, when "the degree of channel variation" is large, there is a high possibility that transmission per frame can be more correctly received at the receiving side than transmission of the aggregation frames, and so the overall system throughput can be improved.

(2) In embodiment 2, wireless communication apparatus 400 generates the channel variation measurement results, adds these results to the ACK frames and then send feedback to wireless communication apparatus 300. Wireless communication apparatus 300 then analyzes the feedback, understands the condition of the channel and switches frame aggregation (grouping) and frame fragmentation (segmentation). However, the present invention is not limited to this, and the wireless communication apparatus on the receiving side analyzes the channel variation measurement results to generate the "frame generation command signal," and further, it may add this "frame generation command signal" to the ACK frame.

In this case, wireless communication apparatus 400 has a channel variation analyzing section which is provided between channel variation measuring section 410 and ACK frame generating section 420, and similar to frame generation control section 312 described in embodiment 2, the channel variation analyzing section determines the absolute value of the "channel variation rate" from the absolute value of its gradient, based on the channel variation measurement results, and uses it as "channel variation index." Then, the frame generation command signal in accordance with this absolute value of the "channel variation rate" is generated.

Then, ACK frame generating section 420 adds this frame generation command signal to the ACK frame.

In this way, it is possible to switch frame aggregation (grouping) and frame fragmentation (segmentation) in the wireless communication apparatus on the transmitting side, by simply acquiring the frame generation command signal from the received frame and passing it to the frame generating section.

According to the first aspect of the present invention, the wireless communication apparatus adopts a configuration having: a transmission frame generating section that adds a header to a data part and forms a transmission frame; a channel variation index acquiring section that acquires an index of variation of a channel; and a data length deciding section that decides the length of the data part of the transmission frame according to the channel variation index.

According to this configuration, when the channel variation index is large (that is, when the degree of channel variation is high), the length of the data part can be shortened, and, when the channel variation index is small (that is, when the degree of channel variation is low), the length of the data part can be made longer. Therefore, when the degree of channel variation is high and there is a high possibility that a retransmission request will be sent from the receiving side, decreased throughput caused by transmitting shortened long data is suppressed, and when there is a low possibility that a retransmission request will be sent, throughput can be improved by transmitting long data. As a result, it is possible to realize a wireless communication apparatus which improves the overall system throughput.

According to the second aspect of the present invention, the wireless communication apparatus adopts a configuration in which the data length deciding section decides the number of groups or the number of segmentations of a base data unit according to the channel variation index and the transmission frame generating section forms the data part having a length in accordance with the number of groups or the number of segmentations.

According to this configuration, similar to the first aspect, when the channel variation index is large, specifically, the degree of channel variation is high, the length of the data part can be shortened, and when the channel variation index is small, specifically, the degree of channel variation is low, the length of the data part can be made longer. Therefore, when the degree of channel variation is high and there is a high possibility that a retransmission request will be sent from the receiving side, decreased throughput caused by transmitting shortened long data is suppressed, and when there is a low possibility that a retransmission request will be sent, throughput can be improved by transmitting long data. As a result, it is possible to realize a wireless communication apparatus which improves the overall system throughput.

According to the third aspect of the present invention, the wireless communication apparatus adopts a configuration in which the transmission frame generation section has an aggregation frame forming section that groups the number of groups of base data units, adds the header and forms the transmission frame and a fragmentation frame forming section that divides the base data unit in accordance with the number of segmentations, adds the header to each segmentation data and forms the transmission frame.

According to this configuration, similar to the above first aspect, when the channel variation index is large, specifically, the degree of channel variation is high, the length of the data part can be shortened, and when the channel variation index is small, specifically, the degree of channel variation is low, the length of the data part can be made longer. Therefore, when the degree of channel variation is high and there is a high possibility that a retransmission request will be sent from the receiving side, decreased throughput caused by transmitting shortened long data is suppressed, and when there is a low possibility that a retransmission request will be sent, throughput can be improved by transmitting long data. As a result, it is possible to realize a wireless communication apparatus which improves the overall system throughput.

According to the fourth aspect of the present invention, the wireless communication apparatus adopts a configuration in which the channel variation index acquiring section calculates the channel variation index based on feedback information from a receiving side of the transmission frame.

According to this configuration, new signaling for feedback information, etc., is no longer necessary, which allows simplified configuration.

The present application is based on Japanese Patent Application No. 2004-361102, filed on Dec. 14, 2004, the entire content of which is expressly incorporated by reference herein.

INDUSTRIAL APPLICABILITY

The wireless communication apparatus of the present invention provides an advantage of improving the overall system throughput and is in particularly useful as a wireless terminal in a wireless LAN system.

The invention claimed is:

1. A wireless communication apparatus comprising:
a channel variation acquiring section that acquires a magnitude of channel variation, with respect to time;
a data length deciding section that decides a length of a data part of a transmission frame according to the magnitude of channel variation; and
a transmission frame generating section that forms the transmission frame according to the decided length of the data part, wherein:
the data length deciding section decides a number of groups or a number of segmentations of a base data unit according to the magnitude of channel variation;
the transmission frame generating section forms the transmission frame having a length in accordance with the number of groups or the number of segmentations decided by the data length deciding section; and
the data length deciding section increases the number of segmentations of the base data unit when the magnitude of channel variation is high, and increases the number of groups of the base data unit when the magnitude of channel variation is low.

2. The wireless communication apparatus according to claim 1, wherein the transmission frame generating section forms the transmission frame by grouping the base data unit in accordance with the decided number of groups and adding a header, or by dividing the base data unit in accordance with the decided number of segmentations and adding the header to each piece of segmentation data.

3. The wireless communication apparatus according to claim 1, wherein the channel variation acquiring section acquires the magnitude of channel variation based on feedback information from a receiving side of the transmission frame.

4. The wireless communication apparatus according to claim 1, wherein:
the channel variation acquiring section calculates a channel variation rate showing the magnitude of channel variation from a gradient of the channel variation; and
the transmission frame generating section decides the length of the transmission frame, based on feedback information from a receiving side, according to the channel variation rate.

5. A wireless communication method comprising the steps of:
acquiring, with a channel variation acquiring section, a magnitude of channel variation with respect to time;
deciding a length of a data part of a transmission frame according to the magnitude of channel variation;
forming the transmission frame according to the decided length of the data part;
deciding a number of groups or a number of segmentations of a base data unit according to the magnitude of channel variation;
forming the transmission frame having a length in accordance with the number of groups or the number of segmentations; and
increasing the number of segmentations of the base data unit when the magnitude of channel variation is high, and increasing the number of groups of the base data unit when the magnitude of channel variation is low.

* * * * *